F. G. HEINECKE.
CORNSTALK CUTTER.
APPLICATION FILED OCT. 1, 1919.
1,327,997.
Patented Jan. 13, 1920.
FIG_1_
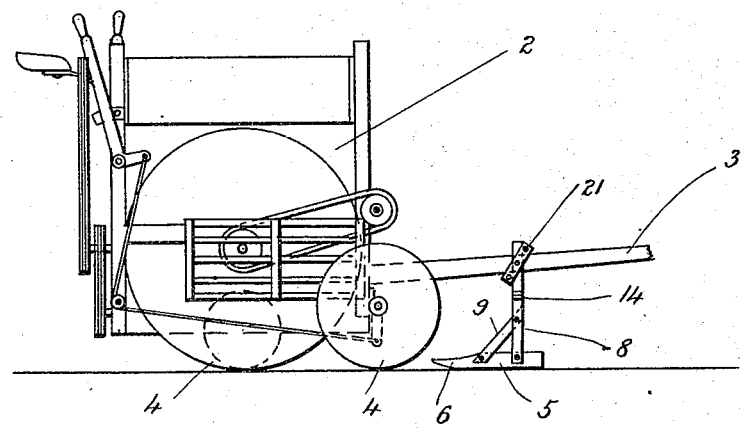
FIG_2_
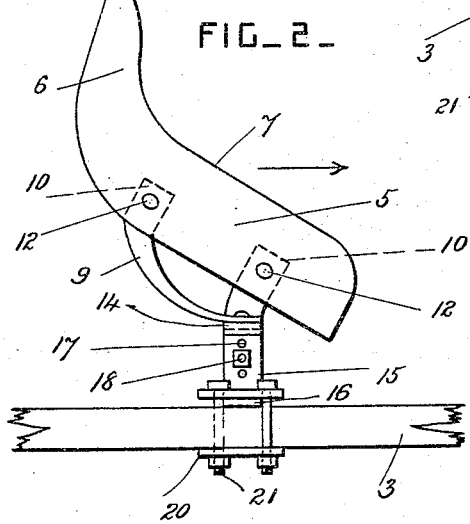
FIG_3_
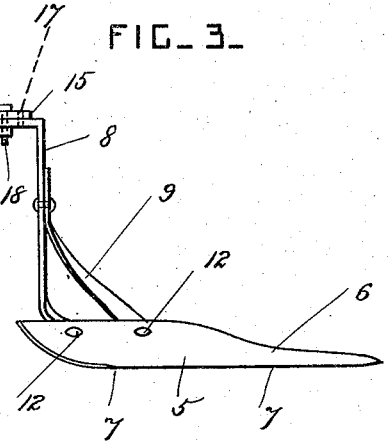
FIG_4_
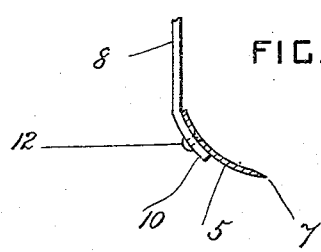
Inventor
Fredrich G. Heinecke.
by Herbert W. Jenner
Attorney.

UNITED STATES PATENT OFFICE.

FREDRICH G. HEINECKE, OF GAYLORD, MINNESOTA.

CORNSTALK-CUTTER.

1,327,997. Specification of Letters Patent. Patented Jan. 13, 1920.

Application filed October 1, 1919. Serial No. 327,700.

*To all whom it may concern:*

Be it known that I, FREDRICH G. HEINECKE, a citizen of the United States, residing at Gaylord, in the county of Sibley and State of Minnesota, have invented certain new and useful Improvements in Cornstalk-Cutters, of which the following is a specification.

This invention relates to machines for shocking and binding corn; and it consists of a cutting blade supported at the front end of the machine and constructed as hereinafter fully described and claimed, and adapted to cut off all projecting stumps of corn stalks in the row previously cut by the machine, so that they are level with the ground.

In the drawings, Figure 1 is a side view in outline of a machine for shocking and binding corn provided with a cutting blade according to this invention. Fig. 2 is a plan view of the cutting blade and its fastening devices drawn to a larger scale. Fig. 3 is a front view of the parts shown in Fig. 2. Fig. 4 is a cross-section through the cutting blade.

The machine 2 for shocking and binding corn is of any approved make, for instance that described and shown in United States Patent No. 482,355, dated Sept. 13, 1892, and it is provided with a longitudinal draft pole 3, and is mounted on ground wheels 4. The cutting blade 5 is shown supported from the draft pole 3, but it may be supported from any other suitable part at the front end of the machine. The cutting blade is formed of a concave plate the main portion of which is straight, and it has a curved and laterally projecting portion 6 at its rear part. The concave side of the blade is arranged uppermost, and the blade is arranged in an inclined position as viewed from its front end, with its cutting edge 7 at its lower side. The cutting edge 7 extends along one side of the main portion of the blade and around the concave edge of the curved portion 6. The main portion of the cutting blade is arranged diagonally of the line of draft as shown in Fig. 2.

A vertical standard 8 is secured to the front end portion of the main part of the blade, and a brace 9 is secured at an angle to the standard between it and the rear end portion of the main part of the blade. The standard 8 and the brace 9 have lugs 10 on their lower ends which project under the raised side portion of the blade and are secured to it by rivets or bolts 12. The heads of these rivets or bolts are preferably countersunk into the blade so that there are no projections on the upper side of the blade.

The vertical standard 8 may be secured directly to the draft pole 3 by any approved fastening devices, but in order to adjust the position of the cutting blade the standard is preferably provided with a horizontal arm 14 at its upper end. This arm 14 is secured against a similar arm 15 on the lower end of an adjustable vertical bar 16 which forms an extension of the standard 8.

The arms 14 and 15 have a series of bolt holes 17, and 18 are bolts for securing them together after they have been set so that the edge of the cutting blade will engage with the stumps of corn stalks to be cut. The bar 16 is secured to the draft pole 3 by any suitable clamp 20 which will permit the position of the cutting blade to be adjusted vertically. The clamp 20 is formed of two flat plates having the tongue 3 and bar 16 arranged between them, as shown in Fig. 2. Clamping bolts 21 engage with the end portions of the plates, and when these bolts are slackened or removed the bar 16 can be slid vertically to adjust the position of the blade 5 with relation to the ground. In Fig. 1, three fastening bolts or pins are shown, but two are sufficient.

The blade cuts off the stumps of the cornstalks which were cut down on the previous round of the machine, shaving them off close to the ground, and leaving the field clean and free of projections. This is advantageous when the field is to be harrowed or plowed later on, or used for any purpose for which the projecting stumps of corn stalks would be objectionable.

The straight main portion of the blade cuts off the corn stalks, and its curved rear portion catches those which bend or spring away from it or which it fails to sever. The straight diagonal portion of the blade 5 operates with a slicing cut which is desirable on account of the shortness of the corn stalk stumps, and the curved portion of the blade cuts off any stumps which are pushed laterally by the diagonal part of the blade.

What I claim is:

1. The combination, with a corn binding machine, of a blade for cutting the stumps of the corn stalks, said blade being secured at the front end of the said machine and having a straight main portion arranged in a position inclined to the horizontal and disposed diagonally of the line of draft and having a curved portion which projects laterally of it at its rear part, said main and curved portions having a cutting edge at their lower side which operates to slice through and cut off the projecting stumps of the corn stalks.

2. The combination, with a corn binding machine, of a vertically adjustable bar secured at the front end of the machine and having a laterally projecting arm at its lower end, a vertical standard having a laterally projecting arm which is secured adjustably to the aforesaid arm, and a blade secured to the lower part of the standard, said blade having a straight main portion arranged in a position inclined to the horizontal and disposed diagonally of the line of draft and having a curved portion which projects laterally of it at its rear part, said main and curved portions having a cutting edge at their lower side which operates to cut off the projecting stumps of the corn stalks.

In testimony whereof I have affixed my signature.

FREDRICH G. HEINECKE.